United States Patent [19]

Wu et al.

[11] Patent Number: 5,739,620

[45] Date of Patent: Apr. 14, 1998

[54] OPTIMUM GROOVE/POLE RATIO FOR BRUSHLESS MOTOR STATOR PROFILE

[75] Inventors: Min-Der Wu, Tai Chung; Shyh-Jier Wang, Hsinchu Hsien, both of Taiwan

[73] Assignee: Industrial Technology Research Institute, Taipei, Taiwan

[21] Appl. No.: 775,351

[22] Filed: Jan. 3, 1997

[51] Int. Cl.$^6$ ............... H02K 1/12; H02K 19/04; H02K 21/22
[52] U.S. Cl. ............... 310/254; 310/162; 310/164
[58] Field of Search ............... 310/162, 164, 310/67 R, 49 R, 254

[56] References Cited

U.S. PATENT DOCUMENTS

| | | | |
|---|---|---|---|
| 4,647,802 | 3/1987 | Konecny | 310/49 R |
| 5,093,599 | 3/1992 | Horng | 310/254 |
| 5,146,127 | 9/1992 | Smith | 310/166 |
| 5,148,090 | 9/1992 | Oku et al. | 310/254 |
| 5,506,458 | 4/1996 | Pace et al. | 310/67 R |
| 5,539,263 | 7/1996 | Lee | 310/67 R |

*Primary Examiner*—Clayton E. LaBalle
*Attorney, Agent, or Firm*—Cushman Darby & Cushman IP Group of Pillsbury Madison & Sutro LLP

[57] ABSTRACT

A stator for a single-phase axially wound brushless motor with a diametrical air-gap has a plate structure with at least one plate whose profile comprises: a central circular hole; a plurality of salient poles surrounding the central hole with each salient pole having a symmetrical profile; and a groove opening for every two adjacent salient poles. The ratio of the included angle of the two sides of a groove opening divided by the pitch angle of salient poles is between 0.55 to 0.68.

3 Claims, 6 Drawing Sheets

4
OPTIMUM GROOVE/POLE RATIO FOR BRUSHLESS MOTOR STATOR PROFILE

BACKGROUND OF THE INVENTION

1. Field of Invention

This invention relates in general to a stator profile design for brushless motors, and more particularly to the definition of an optimum groove/pole ratio for the stator profile of brushless motors.

2. Description of Related Art

Brushless motors, due to properties such as possible miniaturization, relative flatness and good concealment, are commonly used in small machines as well as some precision automatic controlling systems. At present, brushless motors with permanent magnets can be classified into three main types, namely: diametrically wound with diametrical air-gap, diametrically wound with axial air-gap and axially wound with diametrical air-gap. Among the three types, the axially wound with diametrical air-gap type of brushless motor has relatively lower production cost and higher yield, and finds application in environments requiring moderately low output torque. For low speed CD-ROM, the three-phase axial air-gap type of motor is usually employed as its main shaft driver, and it has the advantage of virtually no cogging torque but suffers from defects such as low efficiency, low torque, manufacturing hardship in winding the stator as well as difficulties in assembling the coil onto the circuit board. A High-speed CD-ROM will usually employ a three-phase diametrical air-gap type of brushless motor as its main shaft driver, and no matter whether an 8-pole and 9-groove or a 12-pole and 9-groove design is used, the stator is all formed into the shape of grooved radiating teeth with windings around the belly-side of the grooved teeth. Such windings are not only harder to produce and require longer production times, but also suffer from disadvantages such as wire insulation problems, wire breakage and low yield. Moreover, three Hall sensors must be used for a three-phase motor and therefore a minimum of six power transistors are necessary to drive the system, hereby boosting up the number of fundamental electrical components and required hence driving up the cost.

A single-phase axially wound brushless motor having a diametrical air-gap has already been used. (Related patent: U.S. Pat. No. 4891567). This type of motor has only a single axially wound coil inside a plastic bobbin which makes wiring particularly easy, and as a result, increases the yield, lowers the production time while providing good wiring insulation. Moreover, a single-phase brushless motor demands only a single Hall sensor and, at most, four power transistors for the driving system, and therefore entails a lower production cost. However, due to a larger torque ripple, larger cogging torque, lower efficiency and lower torque at high rotating speeds for this type of motor, its applications are mostly limited to situations requiring moderate precision and constant rotating speed such as in cooling fans. In axially wound brushless motors with diametrical air-gap, in order to combat motor start-up problems, the stator is conventionally shaped into a nonsymmetrical profile as shown in FIG. 1. Referring to FIG. 1, a salient pole 12 of the stator 10 is nonsymmetrical about the central axis 11, and this type of design helps the rotor avoid stopping at the die point. (Related patents: U.S. Pat. Nos. 4899075, 509599, 4987331, 5492458). Yet, with a nonsymmetrical stator profile, there will be a corresponding increase in the cogging torque of the motor. Consequently, whenever the power output of the motor is turned up, vibrations and noises will occur compromising the controllability as well as the life of the motor as a result of this cogging torque. If such motors are used in CD-ROMs or hard drives, too much cogging torque will cause speed fluctuations leading to poor read/write quality.

SUMMARY OF THE INVENTION

It is therefore an object of this invention to provide a stator profile having symmetrical salient poles for brushless motors, and also to define the stator profile with an optimum groove/pole ratio so as to reduce the cogging torque as well as to raise the overall performance.

To achieve the above and related objects, a new type of stator for a single-phase axially wound brushless motor with diametrical air-gap is provided. The brushless motor stator has a plate structure with at least one plate whose profile includes: a central circular hole; a number of salient poles with a symmetrical profile surrounding the central hole; and a groove opening for every two adjacent salient poles. The ratio of the included angle of the two side of a groove opening divided by the pitch angle of the salient poles (or the groove/pole ratio) is between 0.55 to 0.68.

According to one preferred embodiment of this invention, using a symmetrical salient pole profile together with an optimum groove/pole ratio for the brushless motor stator profile, not only can reduce the cogging torque, but also can raise the rating torque and decrease inductive effects as well.

BRIEF DESCRIPTION OF THE DRAWINGS

Other objects, features, and advantages of the invention will become apparent from the following detailed description of the preferred but non-limiting embodiments. The description is made with reference to the accompanying drawings in which.

DESCRIPTION OF THE PREFERRED EMBODIMENT

Figure 1:
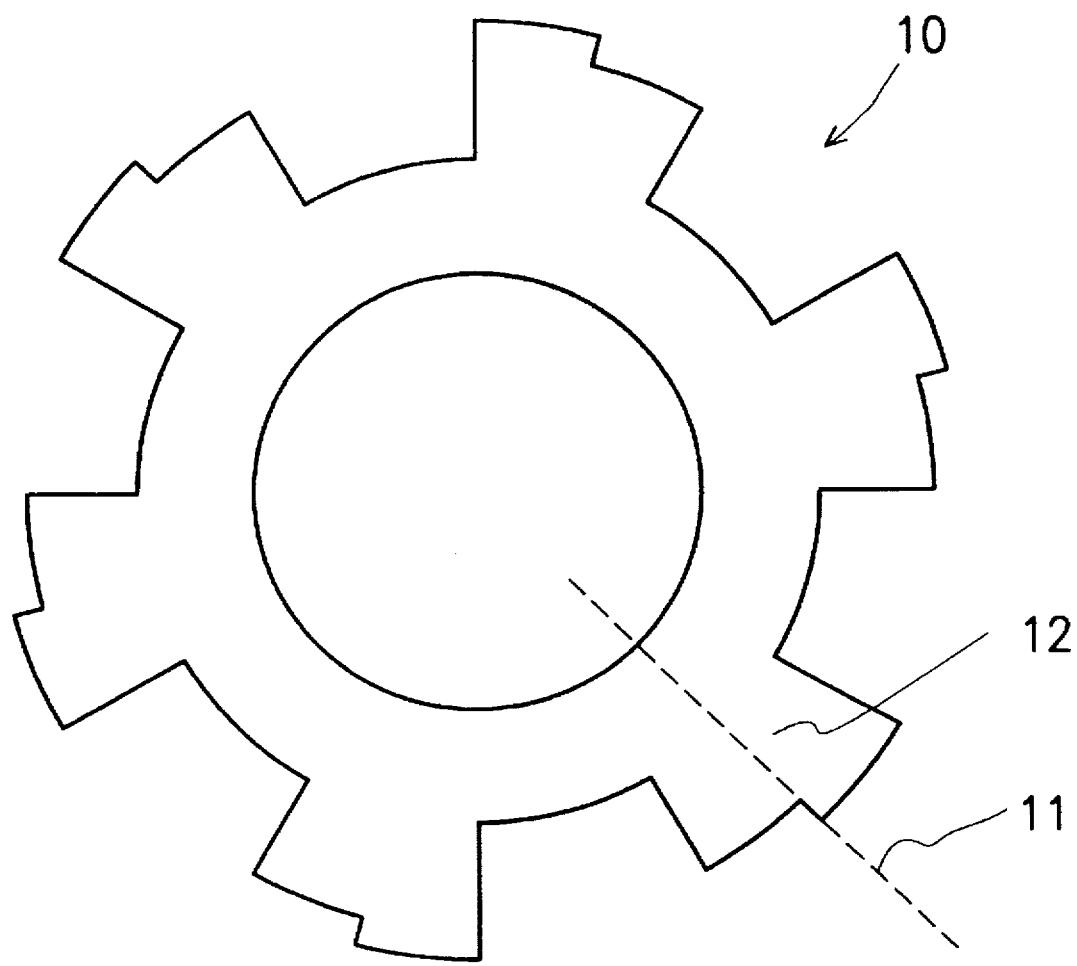
FIG. 1 is a top view showing the external profile of a conventional brushless motor stator.
Figure 2:
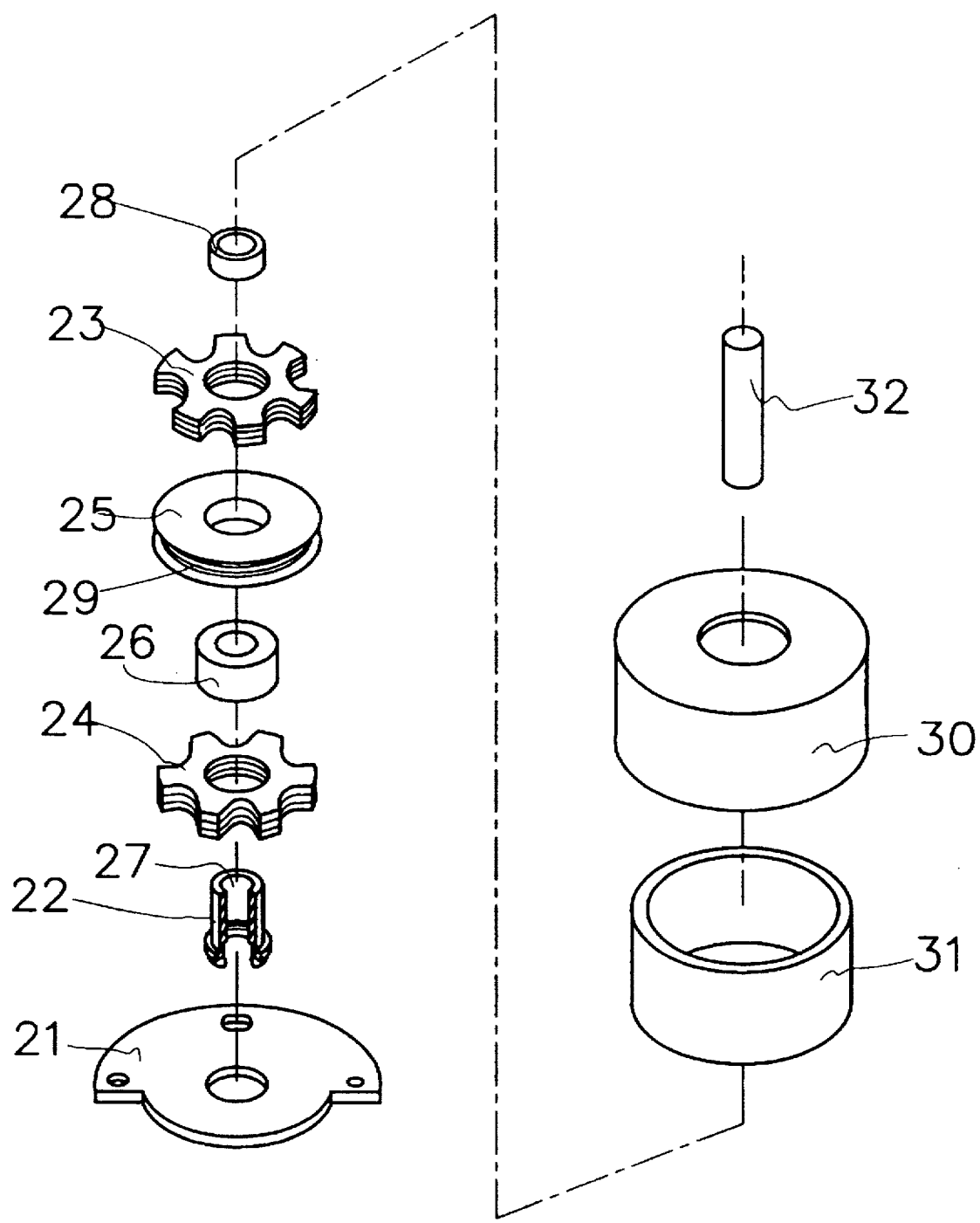
FIG. 2 is an exploded view showing the components of the brushless motor according to a preferred embodiment of the present invention.
Figure 3:
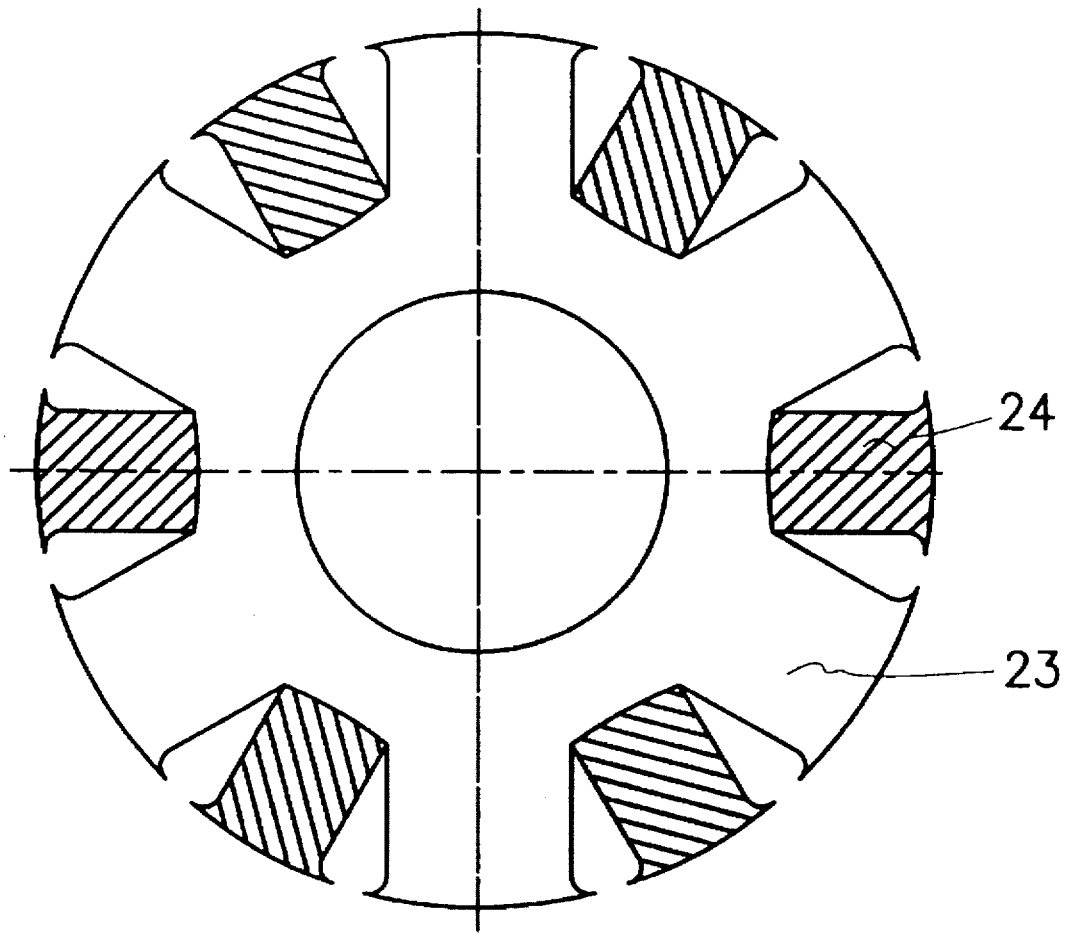
FIG. 3 is a top view showing the top and bottom plates positioned at 180° electronic phase angle with each other in the stator assembly.

With reference first to FIG. 2, FIG. 2 illustrates an exploded view of all the components of an axially wound brushless motor with a diametrical air-gap according to this invention. The main structure of this brushless motor includes two main parts, namely a stator and a rotor. The stator part includes a base plate 21, a permeable sleeve 22, a top pole plate 23, a bottom pole plate 24, a plastic wiring bobbin 25 and a permeable ring 26. The base plate 21 is punched out from a uniformly thick sheet of non-magnetic material. The permeable sleeve 22 is made from metallic sheet materials having good permeability, and has a straight internal hole 27 shaped to a very high precision such that tight tolerance exists between an external rim of bearing 28 and the internal diameter of the hole 27. The top and the bottom pole plates are formed by either a single plate or a stack of plates each having salient poles as well as groove openings made from magnetic materials, for example, silicon steel sheets. The top pole plate 23 and the bottom pole plate 24 are both mounted onto the permeable sleeve 22 but positioned in such a way that there is an electronic phase shift of 180° with respect to each other as shown in FIG. 3. With reference to FIG. 3, FIG. 3 is a top view showing the relative positions of the top pole plate 23 and the bottom pole plate 24 as assembled, and in it, the unhatched portion represents the top pole plate 23 while the hatched portion represents the bottom pole plate 24. Coil windings 29 wrap around the plastic bobbin 25. The plastic bobbin 25 connects with the permeable ring 26. The permeable ring 26 slides into the permeable sleeve 22, and is positioned between the top pole plate 23 and the bottom pole plate 24. The permeable ring 26 is also made from materials having good permeability. The permeable sleeve 22 and the permeable ring 26 in connection with the top pole plate 23 and the bottom pole plate 24 together form a magnetic loop. When the coil windings 29 are magnetically excited to act as a magnet, due to flux linkage along the magnetic loop, the salient poles on the top pole plate 23 and bottom pole plates 24 are magnetized to form magnetic poles. The rotor part consists of a rotor body—a yoke iron 30, a circular ring magnet 31 and a rotating shaft 32. The circular ring magnet 31 is actually composed of a number of permanent magnets completely surrounding the ring such that its N and S poles are arranged alongside each other alternately. The circular ring magnet 31 is enclosed by the yoke iron 30 which in turn is coupled to the rotating shaft 32. The shaft 32 is fitted into the bearing hole of bearing 28 inside the permeable sleeve 22. The assembled structure according to the above helps to maintain a constant air-gap width between the external edges of the top pole plate 23 and the bottom pole plate 24 and the internal rim of the circular ring magnet 31 in the diametrical direction.

Figure 4:
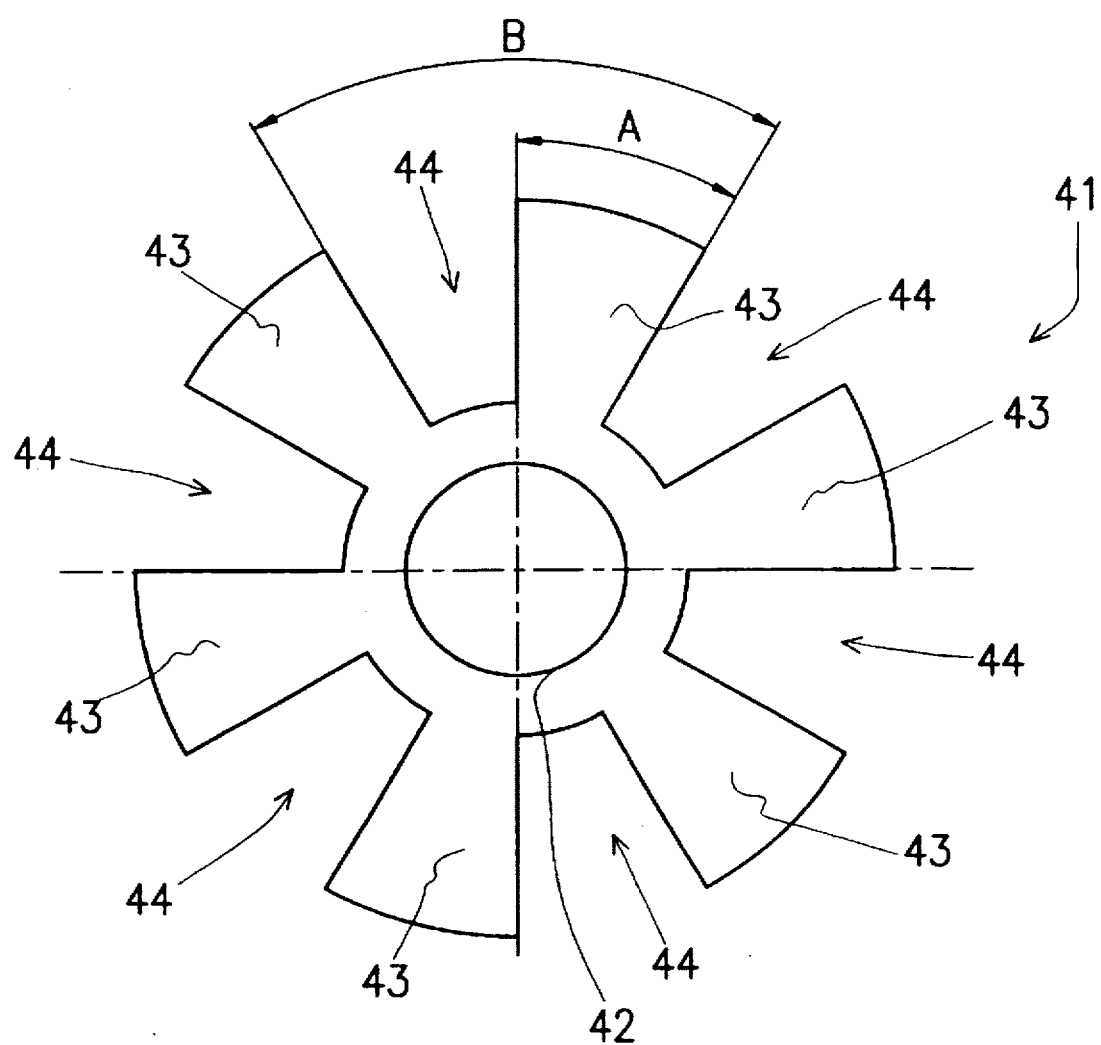
FIG. 4 is a top view showing the new stator design of a brushless motor according to one preferred embodiment of this invention.

With reference next to FIG. 4, FIG. 4 illustrates a top view of the stator in a brushless motor according to the preferred embodiment of this invention, and that is, the shape of the top pole plate 23 and bottom pole plate 24 as shown in FIG. 2. The external profile of the stator of this brushless motor includes: a central circular hole 42, a number of salient poles 43 surrounding the central circular hole 42, and a groove opening 44 for every two adjacent salient poles 43. The salient poles 43 according to the invention substitutes a symmetrical profile such as a circular arc for the nonsymmetrical shape in conventional designs. Angle B as shown in FIG. 4 is the pitch angle of the salient poles 43. For example, for a motor having 12 poles, the pitch angle of the salient poles B is 60°. Angle A as shown in FIG. 4 is the included angle of the two sides of a salient pole 43. Consequently, B - A is the included angle of the two sides of a groove opening 44. The groove opening angle (B-A) divided by the salient pole pitch angle B defines the so-called groove/pole ratio, which is equivalent to (B - A)/B. Experience shows that rating torque as well as cogging torque is altered according to the groove/pole ratio selected.

Figure 5:
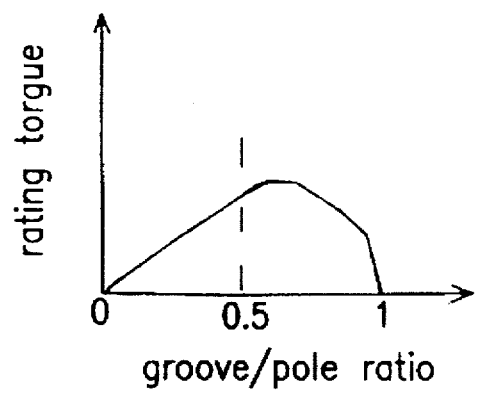
FIG. 5 is a graph showing the relationship between the rating torque and the groove/pole ratio.
Figure 6:
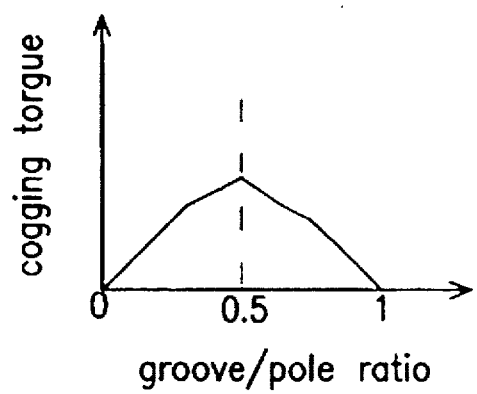
FIG. 6 is a graph showing the relationship between the cogging torque and the groove/pole ratio.

Referring next to FIG. 5 and FIG. 6, FIG. 5 is a graph showing the relationship between the rating torque and the groove/pole ratio while FIG. 6 is a similar graph showing the relationship between the cogging torque and the groove/pole ratio. A groove/pole ratio of 1 or 0 can be regarded as a special case because under such circumstances the stator has become a circular disc with neither salient poles nor groove openings, and so the magnetic field of the permanent magnet cannot link with magnetized coil windings. Consequently, no torque will be induced and the rating torque is 0. The cogging torque will also be 0 due to its symmetrical nature. For rating torque and cogging torque, each has its own optimum value at a certain groove/pole ratio. When the groove/pole ratio is somewhere between 0 and 1, there exists a single groove/pole ratio where the rating torque is the maximun, for example, at a groove/pole ratio of approximately 0.6 as shown in FIG. 5. Similarly, there is a single groove/pole ratio where the cogging torque is the maximun. However, due to the difference in values of groove/pole ratio for getting the maximun rating torque and the maximun cogging torque, and because the optimum stator design would obtain the maximun rating torque and the minimun cogging torque, there is usually a mismatch if one is aiming just for the maximun rating torque because a rather large cogging torque might be incurred. Thus an optimum solution is not achieved merely by aiming for a maximum rating torque.

Figure 7:
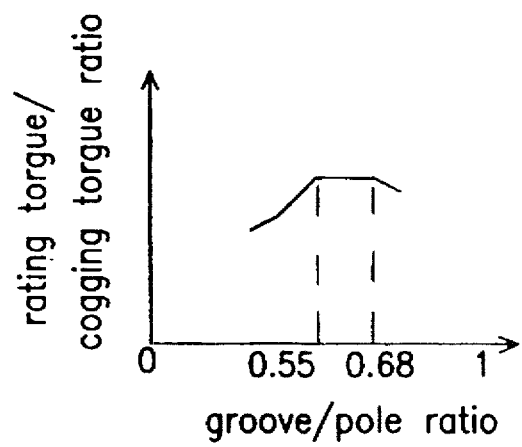
FIG. 7 is a graph showing the relationship between the rating torque/cogging torque ratio and the groove/pole ratio.

With reference next to FIG. 7, in order to get an optimum design according to this invention, the target of optimization of the invention is to get an optimum rating torque/cogging torque ratio. FIG. 7 is a graph showing the actual experimental relationship between the rating torque/cogging torque ratio and the groove/pole ratio. As shown in FIG. 7, the target function (rating torque/cogging torque ratio) reaches optimum values when the groove/pole ratio is somewhere between 0.55 to 0.68. In other words, within the above groove/pole ratio range, there is sufficient rating torque in the motor without causing too much cogging torque. Therefore, a better design of a stator is achieved.

Figure 8:
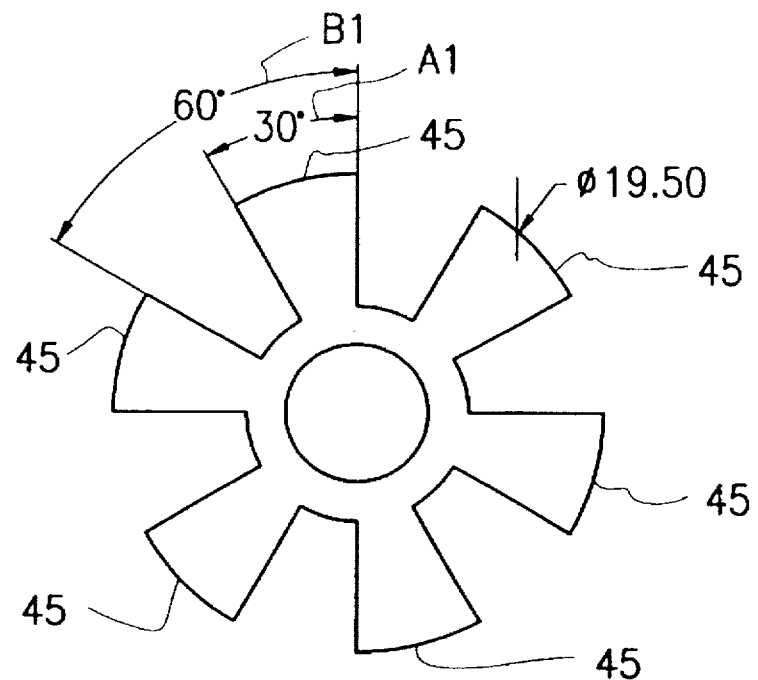
FIG. 8 is a top view showing a stator having a groove/pole ratio of 0.5.
Figure 9:
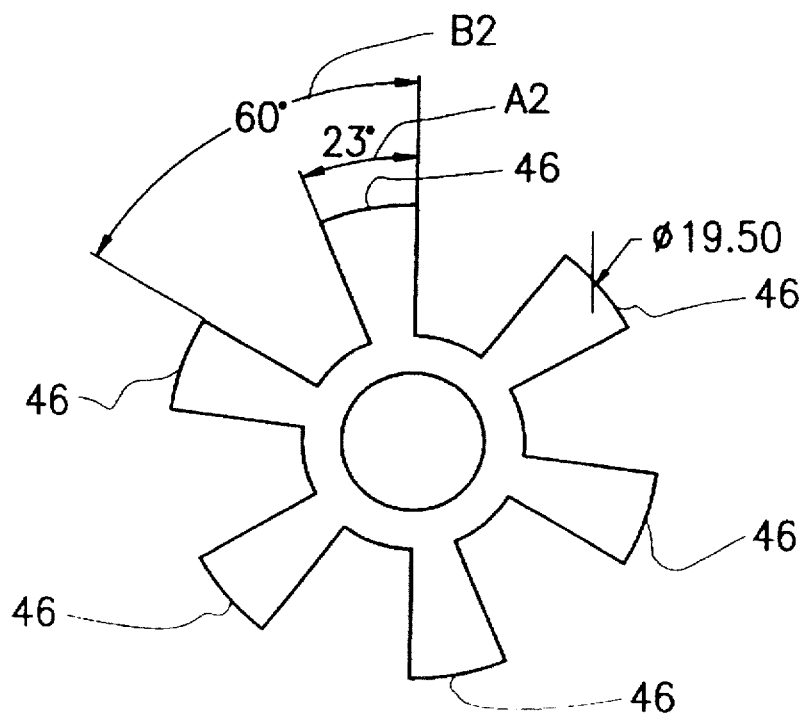
FIG. 9 is a top view showing a stator having a groove/pole ratio of 0.62.

With reference next to FIG. 8 and FIG. 9, a motor having an MQ rotor with 12 magnetic poles, and supplied with a steady current of 0.1 A is taken as an example in actual experiments. The rating torque/cogging torque ratio is 0.92 for a stator with a groove/pole ratio of 0.5. But when the groove/pole ratio of the stator design is 0.62, with the other conditions remaining the same, the rating torque/cogging torque ratio now becomes 2.378. As shown in FIG. 8, the pitch angle of the salient poles B1 is 60° while the salient pole angle A1 is 30°, together the groove/pole ratio is therefore 0.5. In FIG. 9, the pitch angle of the salient poles B2 is 60° but the salient pole angle A2 is only 23°, therefore the groove/pole ratio is 0.62. The arc of the salient pole rims labeled 45 and 46 in FIGS. 8 and 9 both have the same diameter of 19.5 mm. Comparing the above two results, it becomes obvious that a motor having a groove/pole ratio of 0.62 is better than one having the ratio of 0.5. In fact, the target function with a groove/pole ratio of 0.62 is 2.58 times better than the one with a groove/pole ratio of 0.5. This invention has been applied to the main shaft motor in 8× CD-ROMs and has tested positively.

According to the optimization method of the invention, an optimum brushless motor stator profile is obtained when the groove/pole ratio is between 0.55 to 0.68. With such a groove/pole ratio, the motor has a larger rating torque accompanied by a smaller cogging torque. Therefore, the performance of the motor is improved.

While the invention has been described by way of example and in terms of the preferred embodiment, it is to be understood that the invention is not limited to the disclosed embodiments. To the contrary, it is intended to cover various modifications and similar arrangements as would be apparent to those skilled in the art. Therefore, the scope of the appended claims, which define the invention, should be accorded the broadest interpretation so as to encompass all such modifications and similar structures.

What is claimed is:

1. A stator for a single-phase axially wound brushless motor with diametrical air-gap having a plate structure with at least one plate, the profile of said plate comprising:

a central circular hole;

a plurality of salient poles surrounding said central hole, each of said salient poles having a symmetrical profile; and a groove opening between every two adjacent said salient poles, wherein the ratio of the included angle of the two sides of a said groove opening divided by the pitch angle of said salient poles is between 0.55 to 0.68.

2. A stator according to claim 1, wherein the material of said plate includes silicon steel sheets.

3. A stator according to claim 1, wherein said symmetrical profile of said salient poles includes a circular arc.

* * * * *